(12) United States Patent
Mosberger et al.

(10) Patent No.: US 10,560,763 B2
(45) Date of Patent: Feb. 11, 2020

(54) SMART SENSOR TECHNOLOGY

(71) Applicant: eGauge Systems LLC, Boulder, CO (US)

(72) Inventors: David Mosberger, Boulder, CO (US); Alexandra Kaufhold, Denver, CO (US); Robert Cowan, Larayette, CO (US)

(73) Assignee: eGauge Systems LLC, Boulder, CO (US)

( * ) Notice: Subject to any disclaimer, the term of this patent is extended or adjusted under 35 U.S.C. 154(b) by 0 days.

(21) Appl. No.: 16/093,937

(22) PCT Filed: Apr. 13, 2017

(86) PCT No.: PCT/US2017/027359
§ 371 (c)(1),
(2) Date: Oct. 15, 2018

(87) PCT Pub. No.: WO2017/180837
PCT Pub. Date: Oct. 19, 2017

(65) Prior Publication Data
US 2019/0110114 A1    Apr. 11, 2019

Related U.S. Application Data

(60) Provisional application No. 62/322,112, filed on Apr. 13, 2016.

(51) Int. Cl.
*H04Q 9/00* (2006.01)
(52) U.S. Cl.
CPC ..................... *H04Q 9/00* (2013.01)

(58) Field of Classification Search
CPC ......................................................... H04Q 9/00
See application file for complete search history.

(56) References Cited

U.S. PATENT DOCUMENTS

| | | | |
|---|---|---|---|
| 4,736,367 A | 4/1988 | Wroblewski | |
| 8,421,443 B2 | 4/2013 | Bitsch et al. | |
| 2015/0077254 A1 | 3/2015 | Leyden | |
| 2018/0270632 A1* | 9/2018 | Kaneeda | ............... G08C 17/02 |

OTHER PUBLICATIONS

International Search Report and Written Opinion for PCT/US2017/027359 dated Jun. 28, 2017.

* cited by examiner

*Primary Examiner* — Curtis B Odom

(57) ABSTRACT

Examples of the present disclosure describe smart sensor technology. In an example, a smart sensor module may connect to a sensor using two connectors. Similarly, an external device may connect to the smart sensor module using two connectors, such that, in a pass-through operating state, a signal from the sensor is passed through the smart sensor module to the external device, thereby causing the smart sensor module to appear as an ordinary sensor and enabling the external device to sense the signal from the sensor. In another example, the smart sensor module may have an alternate operating state, wherein additional functionality is enabled, including, but not limited to, communication with a controller, activation of a light emitting diode (LED) or other indicator, or the retrieval and/or storage of information. The operating state may be selected based on the manner in which the external device connects to the smart sensor module.

20 Claims, 11 Drawing Sheets

| ☐ CT | ⊞ Model | Last Scanned | Blink LED |
|---|---|---|---|
| ☑ 1 | n/a | | ◉ |
| ☑ 2 | n/a | | ◉ |
| ☑ 3 | n/a | | ◉ |
| ☑ 4 | n/a | | ◉ |
| ☑ 5 | n/a | | ◉ |
| ☑ 6 | n/a | | ◉ |
| ☐ 7 | n/a | | ◉ |
| ☐ 8 | n/a | | ◉ |
| ☐ 9 | n/a | | ◉ |
| ☐ 10 | n/a | | ◉ |
| ☐ 11 | n/a | | ◉ |
| ☐ 12 | n/a | | ◉ |

Scan Checked CTs

FIG. 8A

| □ CT | ⊞ Model | Last Scanned | Blink LED |
|---|---|---|---|
| □ 1 ✓⊞ | J&D JMN 21mm/0.83" 100A | 09/06/16/ 12:52pm | ⊚ |
| □ 2 ✓⊞ | J&D JMN 21mm/0.83" 100A | 09/06/16/ 12:52pm | ⊚ |
| □ 3 ✓⊞ | J&D JMN 21mm/0.83" 100A | 09/06/16/ 12:53pm | ⊚ |
| ▷ 4 □ | scanning with normal polarity... | | ⊚ |
| ▷ 5 | n/a | | ⊚ |
| ▷ 6 | n/a | | ⊚ |
| □ 7 | n/a | | ⊚ |
| □ 8 | n/a | | ⊚ |
| □ 9 | n/a | | ⊚ |
| □ 10 | n/a | | ⊚ |
| □ 11 | n/a | | ⊚ |
| □ 12 | n/a | | ⊚ |

Cancel Scan

FIG. 8B

| ☐ CT | ⊞ Model | Last Scanned | Blink LED |
|---|---|---|---|
| ☐ 1 ✓ ⊟ | J&D JMN 21mm/0.83" 100A | 09/06/16/ 12:52pm | ◎ |
| | SN 1, AC sensor, 0.33146V (+0ppm/°C) and +0.02° (+0ppm/°C) at 100A, normal polarity, manufacturer-specific data 0x0. | | |

Calibration Table

| Current | Voltage adj. | Phase adj. |
|---|---|---|
| 1.5% | +0.36% | +0.36° |
| 5.0% | +0.16% | +0.32° |
| 15.0% | +0.12% | +0.28° |
| 50.0% | +0.08% | +0.16° |

| ☐ CT | ⊞ Model | Last Scanned | Blink LED |
|---|---|---|---|
| ☐ 2 ✓ ⊞ | J&D JMN 21mm/0.83" 100A | 09/06/16/ 12:52pm | ◎ |
| ☐ 3 ✓ ⊞ | J&D JMN 21mm/0.83" 100A | 09/06/16/ 12:53pm | ◎ |
| ☐ 4 ✓ ⊞ | J&D JMN 21mm/0.83" 100A | 09/06/16/ 12:53pm | ◎ |
| ☐ 5 ✓ ⊞ | J&D JMN 21mm/0.83" 100A | 09/06/16/ 12:53pm | ◎ |
| ☐ 6 ✗ | n/a | | ◎ |
| ☐ 7 | n/a | | ◎ |
| ☐ 8 | n/a | | ◎ |
| ☐ 9 | n/a | | ◎ |
| ☐ 10 | n/a | | ◎ |
| ☐ 11 | n/a | | ◎ |
| ☐ 12 | n/a | | ◎ |

Scan Checked CTs

FIG. 8C

SMART SENSOR TECHNOLOGY

CROSS-REFERENCE TO RELATED APPLICATION

This application is a National Stage Application of PCT International patent application No. PCT/US2017/027359, filed Apr. 13, 2017, which claims priority to U.S. Provisional Application No. 62/322,112, filed Apr. 13, 2016, which applications are incorporated herein by reference. A claim of priority is made to each of the above applications.

INTRODUCTION

Sensors have a wide array of potential uses and applications. However, given the many different kinds of sensors and sensor manufacturers, there may be many varying characteristics and attributes between sensor types or even among sensors of the same type. As a result, managing such sensor type-specific and/or sensor-specific idiosyncrasies may be difficult.

It is with respect to these and other general considerations that the aspects disclosed herein have been made. Also, although relatively specific problems may be discussed, it should be understood that the examples should not be limited to solving the specific problems identified or discussed in this disclosure.

SMART SENSOR TECHNOLOGY

Examples of the present disclosure describe smart sensor technology. In an example, a smart sensor module may connect to a sensor using two connectors. Similarly, an external device may connect to the smart sensor module using two connectors, such that, in a pass-through operating state, a signal from the sensor is passed through the smart sensor module to the external device, thereby causing the smart sensor module to appear as an ordinary sensor and enabling the external device to sense the signal from the sensor. In another example, the smart sensor module may have an alternate operating state, wherein additional functionality is enabled, including, but not limited to, communication with a controller, activation of a light emitting diode (LED) or other indicator, or the retrieval and/or storage of information. The operating state may be selected based on the manner in which the external device connects to the smart sensor module.

This overview is provided to introduce a selection of concepts in a simplified form that are further described below in the Detailed Description. As such, it is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIGS. 8A-8C illustrate overviews of an example user interface for interacting with smart sensor technology.

DETAILED DESCRIPTION

Figure 1A:
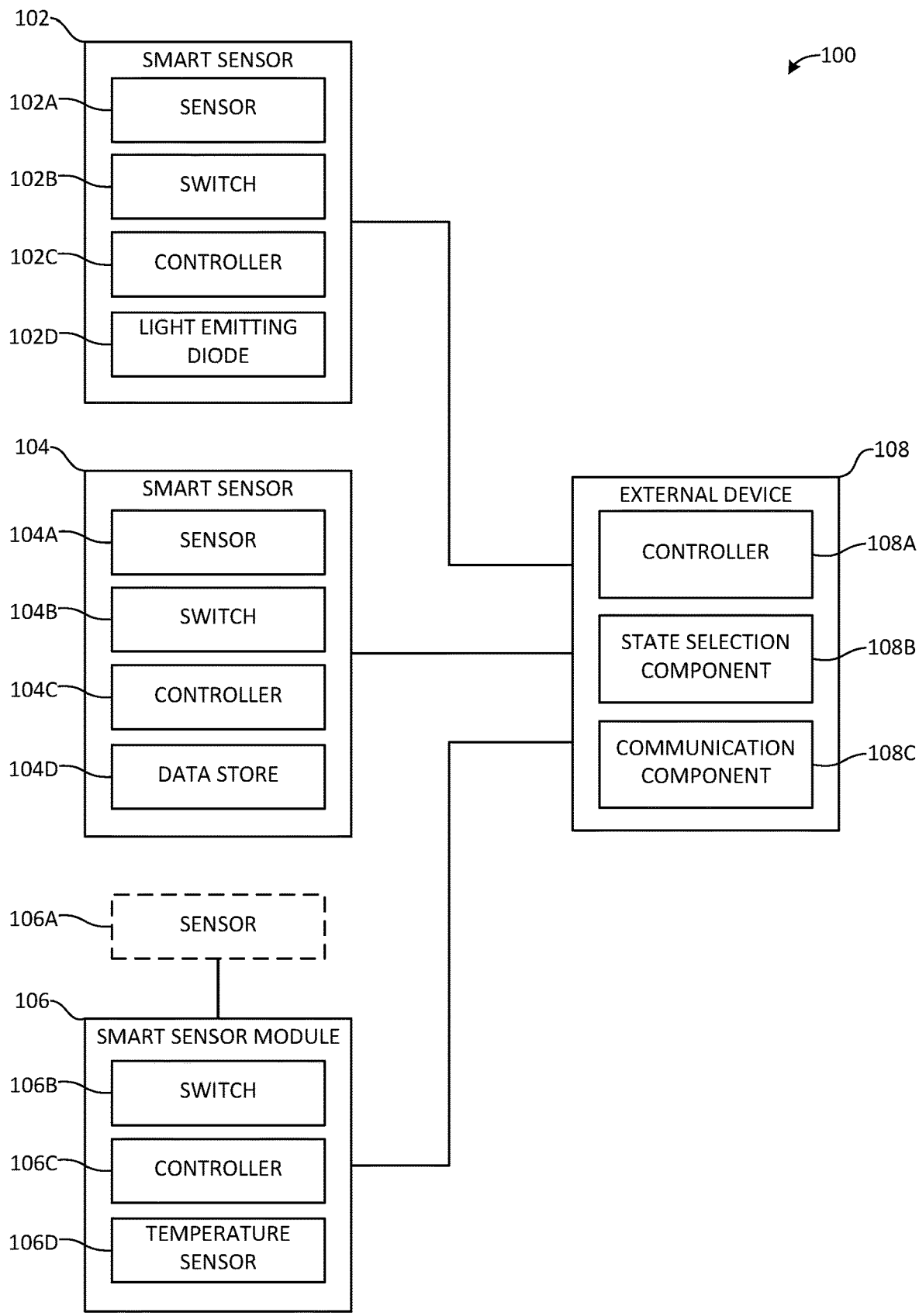
FIGS. 1A and 1B illustrate overviews of example systems for practicing aspects of smart sensor technology.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Examples of the present disclosure describe smart sensor technology. In an example, a smart sensor module may connect to a sensor using two connectors. Similarly, an external device may connect to the smart sensor module using two connectors, such that, in a pass-through operating state, signal from the sensor is passed through the smart sensor module to the external device, thereby causing the smart sensor module to appear as an ordinary sensor and enabling the external device to sense the signal from the sensor. In another example, the smart sensor module may have an alternate operating state, wherein additional functionality is enabled, including, but not limited to, communication with a controller, activation of a light emitting diode (LED) or other indicator, or the retrieval and/or storage of information. The operating state may be selected based on the manner in which the external device connects to the smart sensor module.

A sensor is a device that responds to a physical stimulus and transmits a resulting signal. In an example, an electronic device may receive the signal from the sensor. The sensor may be any kind of sensor, including, but not limited to, a current sensor, a temperature sensor, a humidity sensor, a barometer, a moisture content sensor, a light or imaging sensor, a microphone, a gas sensor (e.g., an oxygen sensor, a carbon dioxide sensor, an hydrogen sulfide sensor, etc.), a flow sensor, a sensor having pulse output, a dry contact switch, an accelerometer sensor, a biometric sensor (e.g., fingerprint sensor, muscle sensor, heart rate monitor, etc.), a capacitance sensor, a flex/force sensor, a weight sensor, a gyrometer, a radio frequency sensor (e.g., RFID, near field communication, Bluetooth, Wi-Fi, etc.), an inertial measurement unit, a magnetometer, a proximity sensor, a radiation sensor, or a weather or environmental sensor, among other sensors.

In an example, the sensor may be powered (e.g., active) or unpowered (e.g., passive). As discussed herein, a smart sensor module may connect to the sensor and may provide various operating states. In a pass-through operating state, the smart sensor module may connect the sensor to the electronic device, such that the electronic device may receive a signal from the sensor. In the pass-through operating state, the smart sensor module may behave similarly to the sensor, thereby appearing to the external device as an ordinary sensor. While aspects of the present disclosure provide examples wherein a sensor or smart sensor module may have two electrical connectors, such as wires or other electrical conductors, it will be appreciated that a sensor or smart sensor module may have more than two connectors. In another example, a smart sensor module may connect to a plurality of sensors, or may be provided without a sensor such that a sensor may be connected or installed later.

Selecting or altering the operating state of a smart sensor module may be performed using any of a variety of techniques. In an example, normal operation of the smart sensor module (e.g., such that information from the sensor may be provided to an external device) may be achieved by connecting to the smart sensor module in a manner similar to that of the sensor with which the smart sensor module is connected. In another example, alternate operation of the smart sensor module may be achieved using any of a variety of techniques. As an example, a voltage may be applied to two connectors of the smart sensor module. In some examples, the voltage may be outside of the operating range of the sensor. If the sensor normally operates in a voltage range of −0.5V to +0.5V range, a higher voltage may be applied. In other examples, current, resistance, and/or polarity may be varied by the external device in order to select or alter the operating state of the smart sensor module. The level at which one or more of these factors is applied to the smart sensor module may be used by the smart sensor module to distinguish between multiple operating states. For example, a first voltage may be associated with a first operating state, while a second voltage may be associated with a second operating state. While example operating state selection techniques may be discussed herein and may be discussed with reference to various operating states (e.g., a normal operating state, a locate operating state, one or more alternate operating states, etc.), it will be appreciated that an external device may connect to a smart sensor module in any of a variety of ways in order to alter the operating state of the smart sensor module.

As discussed above, depending on the manner in which a smart sensor module is connected, a variety of operating states may be achieved. For example, a smart sensor module may provide a pass-through operating state, wherein the external device may receive information from a sensor of the smart sensor module. While a "pass-through operating state" may be referred to herein as a "normal operating state," it will be appreciated that "normal" is not intended to distinguish the operating state from other operating states of the smart sensor module, but rather may refer to a behavior in which the smart sensor module operates in a similar manner to the sensor of the smart sensor module, thereby appearing to an external device as a normal sensor. In another example, the smart sensor module may provide a locate operating state, wherein the smart sensor module may activate or enable an indicator. An indicator may provide visual feedback (e.g., a lamp or an LED, etc.), auditory feedback (e.g., a buzzer, a speaker, etc.), haptic feedback, among other indications. The indicator may be used to locate the smart sensor module. In another example, the indicator may be used to verify the polarity of the smart sensor module, wherein the output of the indicator may be varied depending on the polarity (e.g., the sound of the buzzer may be of a different pitch or rhythm, the LED may blink or have a different color, etc.).

TABLE 1

Example Information

| Data Type | Unit | Description |
|---|---|---|
| u8 | | Output Format Version |
| u16 | | Manufacturer ID |
| u8*4 | | Model Name |
| u16 | 0.1 mm | Size |
| u24 | | Serial Number |
| u16 | 0.1 A | Rated Current |
| u16 | 10 μV | Voltage at Rated Current |
| u4 | | Sensor Type |
| s12 | 0.01° | Phase at Rated Current |
| s8 | 5 ppm/° C. | Voltage Temperature Coefficient |
| s8 | 5 ppm/° C. | Phase Temperature Coefficient |
| s8*8 | | Calibration Table |
| u8 | | Manufacturer-Specific Information |
| f12 | | Output Resistance |
| f12 | | Rated Load Resistance |
| u16 | | Checksum |

The smart sensor module may provide a unidirectional communication operating state, wherein the smart sensor module may receive information from an external device, or the smart sensor module may provide information to the external device. As an example, unidirectional communication by the smart sensor module may comprise transmitting information to the external device as a result of entering the unidirectional operating state. Table 1 provides a variety of example information that may be communicated between a smart sensor module and an external device. In an example, the communicated information may comprise information relating to hardware (e.g., hardware capabilities, a hardware revision, a model number, a serial number or other unique identifier, operating specifications, etc.), software (e.g., a firmware version, a firmware update, an expected data format, etc.), or any other information. In another example, the communicated information may comprise information obtained from or associated with one or more sensors, such as the sensor with which the smart sensor module is interfaced, a sensor that is part of the smart sensor module, or any combination thereof. In some examples, the communication between the smart sensor module and the external device may be bidirectional, wherein the smart sensor module may both receive information from and transmit information to the external device. As compared to unidirectional communication, bidirectional communication may comprise an exchange of information (e.g., receiving information and generating a response accordingly) rather than providing information in only one direction. Aspects described herein may provide one or more benefits over ordinary or conventional sensor technology, including, but not limited to, polarity detection, output tuning or correction, output mapping, and sensor identification.

FIG. 1A illustrates an overview of an example system 100 for practicing aspects of smart sensor technology. System 100 comprises smart sensors 102 and 104, smart sensor module 106, and external device 108. As described herein, smart sensors 102 and 104, and smart sensor module 106 represent examples of smart sensor technology that may include or otherwise be connected to one or more sensors 102A, 104A, and 106A.

As illustrated, smart sensor 102 is connected to sensor 102A and smart sensor 104 is connected to sensor 104A.

These smart sensors 102 and 104 are integrated into a single physical component. In one example, the integrated smart sensors 102 and 104 may be designed to approximate the commercial size and shape of the ordinary sensors that correspond to sensors 102A and 104A. In one example, an external marking is provided to show users that the smart sensors 102 and 104 are not ordinary sensors.

Smart sensor 106 is an example of another configuration in which the components that provide the smart technology are provided in a separate housing, which allows ordinary sensors 106A to be retrofit to act as smart sensors. Ordinary sensor 106A is shown as being external to or remote from smart sensor module 106. Further, sensor 106A is illustrated using a dashed box to indicate that, while smart sensor module 106 may not be currently connected to a sensor, a sensor may be connected to smart sensor module 106 at another time.

Smart sensor 102 includes switch 102B and controller 102C. In an example, switch 102B may be used to adjust the operating state of smart sensor module 102. Switch 102B may be any of a variety of switches, including, but not limited to, a relay, a field-effect transistor (FET), a bipolar junction transistor (BJT), or an integrated circuit that performs a switching function, possibly in addition to other functions. Switch 102B and controller 102C may be used to provide a plurality of operating states for smart sensor 102. As an example, in a first operating state (e.g., a pass-through operating state), sensor 102A of smart sensor 102 may be connected, such that a signal from sensor 102A may be received by external device 108. In some examples, the signal received by external device 108 may be similar or slightly different as compared to the signal provided by sensor 102A, as a result of passing through smart sensor 102. In a second operating state, switch 102B and controller 102C may enter a locate operating state, wherein light emitting diode 102D may provide an indication that may be used to locate smart sensor 102 or verify its polarity.

Similarly, smart sensor 104 comprises switch 104B and controller 104C. Using switch 104B and controller 104C, smart sensor module 104 may provide a variety of operating states. In a first operating state (e.g., a pass-through operating state), sensor 104A may be connected, such that a signal from sensor 104A may be received by external device 108. In a second operating state (e.g., a unidirectional or bidirectional communication operating state), controller 104B may access information from and/or store information in data store 104C. In an example, the information may comprise hardware information, software information, or any other type of information.

With respect to smart sensor module 106, smart sensor module 106 comprises switch 106B and controller 106C. Using switch 106B and controller 106C, smart sensor module 106 may provide a variety of operating states. In a first operating state, sensor 106A may be connected, such that a signal from sensor 106A may be received by external device 108. In some examples, an indication may be provided that no sensor is present. In a second operating state, controller 106C may provide information from temperature sensor 106D. As an example, controller 106C may connect temperature sensor 106D such that a signal from temperature sensor 106D may be received by external device 108.

Sensors 102A and 104A may be similar types of sensors or may be different types of sensors. In an example, controllers 102C and 104C may provide information relating to sensors 102A and 104A to external device 108, such that external device 108 may receive an indication relating to a sensor type, output units, or output format, among other information as discussed herein. In example, controller 102C may generate the information (e.g., based on an evaluation of sensor 102A, based on environmental conditions, etc.), while controller 104C may access information from data store 104D. Similarly, controller 106C may determine that sensor 106A is not present and may provide an indication accordingly. It will be appreciated that a controller may provide information from a data store, as a result of performing one or more operations, or as received from one or more sensors, among other sources. External device 108 may use the received information to perform further processing or to configure communication with each of smart sensor modules 102 and 104 accordingly.

As illustrated, smart sensors 102 and 104, and smart sensor module 106 are connected to external device 108. While smart sensors 102 and 104, and smart sensor module 106 are directly connected to external device 108 as illustrated in system 100, it will be appreciated that a smart sensor may be indirectly connected as well. External device 108 may be any of a variety of devices, including, but not limited to, a computing device (e.g., a personal computing device, a mobile device, a tablet device, a distributed computing device, etc.), a meter device, a hub device, or a data logging device. For example, in an embodiment, the external device is a purpose-built interface for smart sensors that is part of a larger facility management system. In another example, multiple external devices may be used, such that each external device may be connected to one or more smart sensor modules. In some examples, a smart sensor module may be connected to multiple external devices.

External device 108 comprises controller 108A, state selection component 108B, and communication component 108C. Controller 108A may process information received from or transmitted to smart sensors 102 or 104, or smart sensor module 106. State selection component 108B may be used to configure communication between external device 108 and smart sensors 102 and 104, and smart sensor module 106. As an example, state selection component 108B may change the manner in which external device 108 connects to one or more of smart sensors 102 and 104, and smart sensor module 106, such that a different voltage, current, resistance, and/or polarity is present. In another example, state selection component 108B may provide a specific communication to the controller of a smart sensor module, thereby causing the smart sensor module to enter an indicated operating state.

Communication component 108C may communicate with smart sensors 102 and 104, and smart sensor module 106. As such, communication component 108C may receive information from a sensor of a smart sensor module or engage in unidirectional or bidirectional communication with a controller of a smart sensor module, among other communications. In an example, communication may be achieved by modulating the voltage and/or current draw between external device 108 and a smart sensor module. As will be appreciated, while example components, configurations, and operations are discussed above with respect to FIG. 1A, a smart sensor module or external device may have additional, fewer, or different components.

External device 108 may communicate with one or more of smart sensors 102 and 104, and smart sensor module 106 periodically, continuously, or any combination thereof. In an example, external device 108 may continuously communicate with smart sensors 102 and 104, and smart sensor module 106 while they are each in a pass-through operating state, thereby gathering information from one or more sensors 102A-106A. In another example, external device 108 may periodically or in response to an event (e.g., a user request, a power failure, an indication received from another hardware or software module, a determination that another smart sensor module has been added, etc.) adjust the operating state of one or more of smart sensors 102 and 104, and smart sensor module 106. As an example, external device 108 may place a smart sensor module into a unidirectional or bidirectional communication operating state so that it may receive information from the controller of the smart sensor module (e.g., controllers 102C-106C). In some examples, external device 108 may determine when a reversed polarity configuration exists between external device 108 and one or more of smart sensors 102 and 104, and smart sensor module 106. External device 108 may provide an indication, may reconfigure the connection to correct the reversed polarity configuration, or may perform any of a variety of other operations.

Figure 1B:
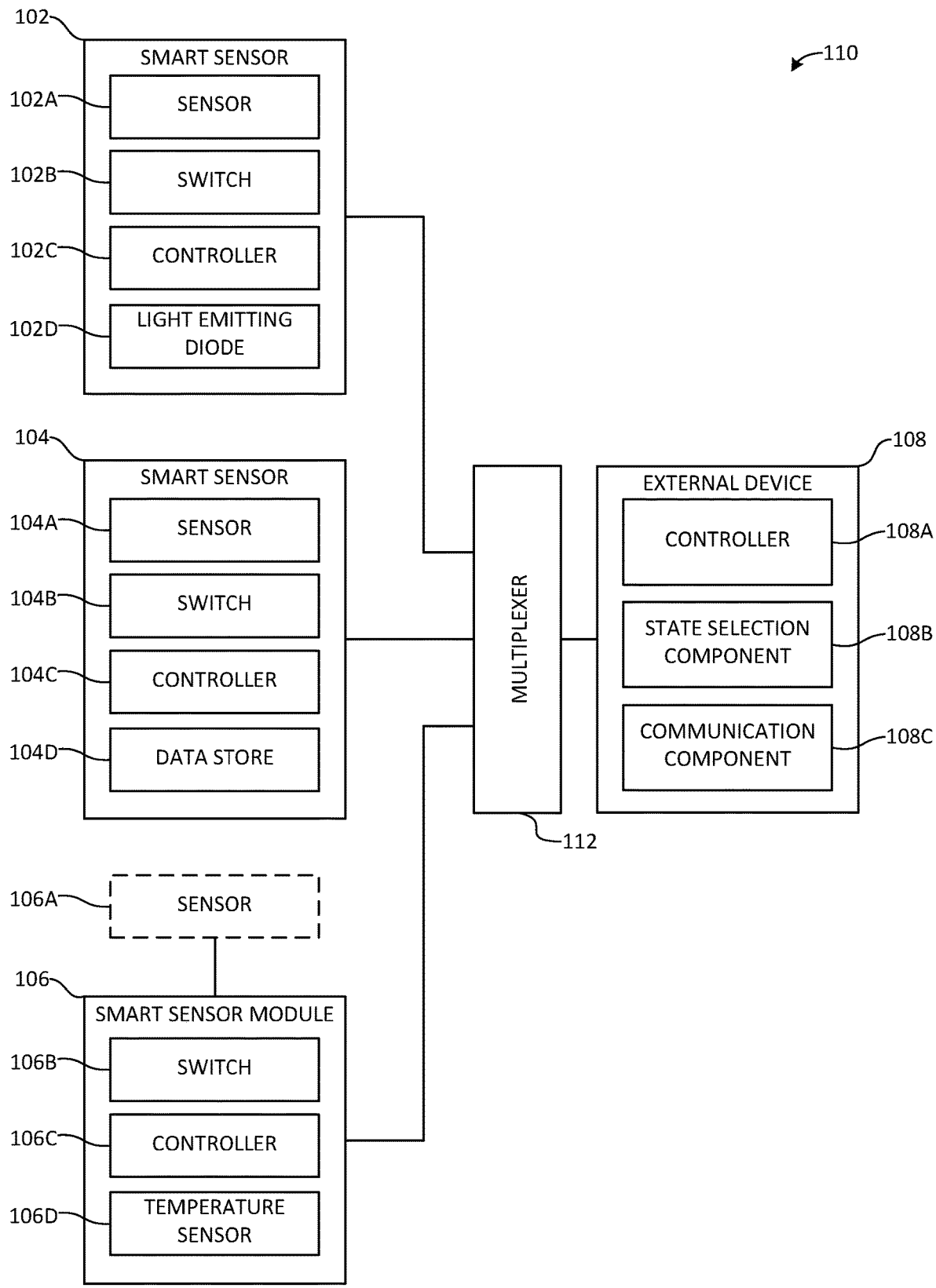

FIG. 1B illustrates an overview of an example system 110 for practicing aspects of smart sensor technology. Similar to system 100 in FIG. 1A, system 110 comprises smart sensors 102 and 104, smart sensor module 106, and external device 108. System 110 also comprises multiplexer 112, which connects external device 108 to smart sensors 102 and 104, and to smart sensor module 106. Multiplexer 112 may enable controller 108A, state selection component 108B, and/or communication component 108C to communicate with each of smart sensor 102 and 104, and smart sensor module 106. In another example, without multiplexer 112, an external device 108 may comprise multiple of controller 108A, state selection component 108B, and/or communication component 108C, such that a smart sensor or smart sensor module may be individually connected (e.g., rather than using one such component to communicate with multiple smart sensors and/or smart sensor modules). By contrast, system 110 is illustrated such that multiplexer 112 is connected to smart sensors 102 and 104, and smart sensor module 106, while external device 108 is illustrated as having only one connection to multiplexer 112. While multiplexer 112 is illustrated as being external or remote from external device 108, it will be appreciated that external device 108 may comprise a multiplexer, such that multiple smart sensors may be connected to external device 108 and multiplexed accordingly. In some examples, an external device may be connected to multiple multiplexers.

Figure 2:
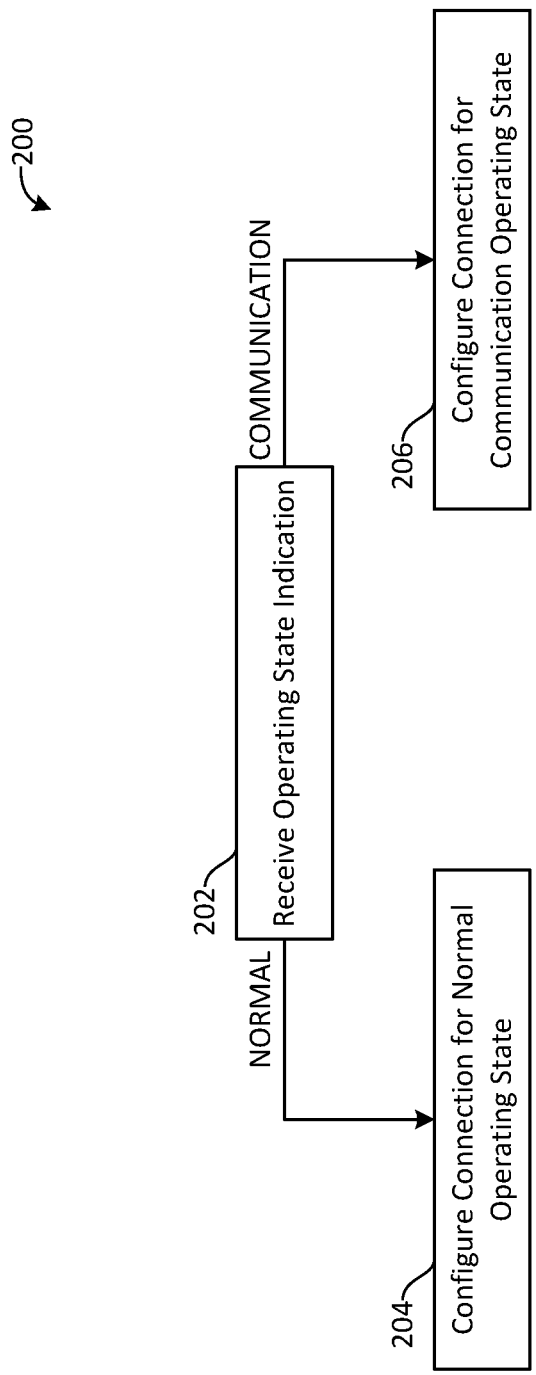
FIG. 2 illustrates an overview of an example method for communicating with smart sensor technology.

FIG. 2 illustrates an overview of an example method 200 for communicating with smart sensor technology. Method 200 may be performed by an external device, such as external device 108 in FIG. 1A. As discussed above, the external device may be a computing device, a meter device, or any other type of device. Method 200 begins at operation 202, where an operating state direction may be received. The operating state direction may select a state from a variety of available states of a smart sensor module. In some examples, the direction may be provided by a user of the external device (e.g., via a user interface as will be discussed with respect to FIGS. 8A-8C), by an automated software application, or from a hardware circuit, among other sources. While FIG. 2 is discussed with respect to two operating states (e.g., a normal operating state and a communication operating state), it will be appreciated that additional or alternative operating states may be available.

If the directed operating state is a normal operating state, flow branches "NORMAL" to operation 204, where the connection with the smart sensor module may be configured for the normal operating state. In an example, configuring the connection of the smart sensor module may comprise a configuration in which the sensor is connected to the smart sensor module outputs, thereby bypassing other components of the smart sensor module. The external device may be configured to measure a voltage difference or a current draw of the sensor, among other measurements. In some examples, an amplifier or an analog-to-digital converter (ADC) may be used to amplify or digitize the output of the smart sensor module. In other examples, the sensor of the smart sensor module may be a powered sensor, wherein a voltage or current may be applied to the connectors of the smart sensor module in order to cause the sensor to generate an output signal. Flow terminates at operation 204.

By contrast, if the indicated operating state is the communication operating state, flow branches "COMMUNICATION" to operation 206, where the connection with the smart sensor module may be configured for the communication operating state. In an example, configuring the connection of the smart sensor module may comprise adjusting the voltage, current, resistance, and/or polarity between the external device and the smart sensor module. As an example, the voltage applied to the connectors of the smart sensor module may be adjusted such that it is outside of the normal operating range for the sensor of the smart sensor module. In another example, the polarity may be adjusted such that it is contrary to the polarity of the sensor of the smart sensor module. In some examples, configuring the connection with the smart sensor module may be performed using one or more switches.

In an example, the sensor of the smart sensor module may be unpowered, and configuring the connection with the smart sensor module may comprise applying a voltage or current to the connectors, thus delivering power to components in the smart sensor module that are unpowered during the normal operating state. In another example, the connectors of the smart sensor module may be connected to one or more digital-to-analog converters (DACs) and/or ADCs, thereby enabling unidirectional or bidirectional communication with the smart sensor module. In some examples, one or more sense resistors and/or load resistors may be used instead of or in addition to ADCs and/or DACs, such that the sense resistor may be used to sense current and/or voltage differences and a load resistor may be used to generate current and/or voltage differences when communicating. As will be appreciated, while example configuration techniques are discussed above, any of a variety of techniques may be applied to select any number of operating states for a smart sensor module. Flow terminates at operation 206.

Figure 3:
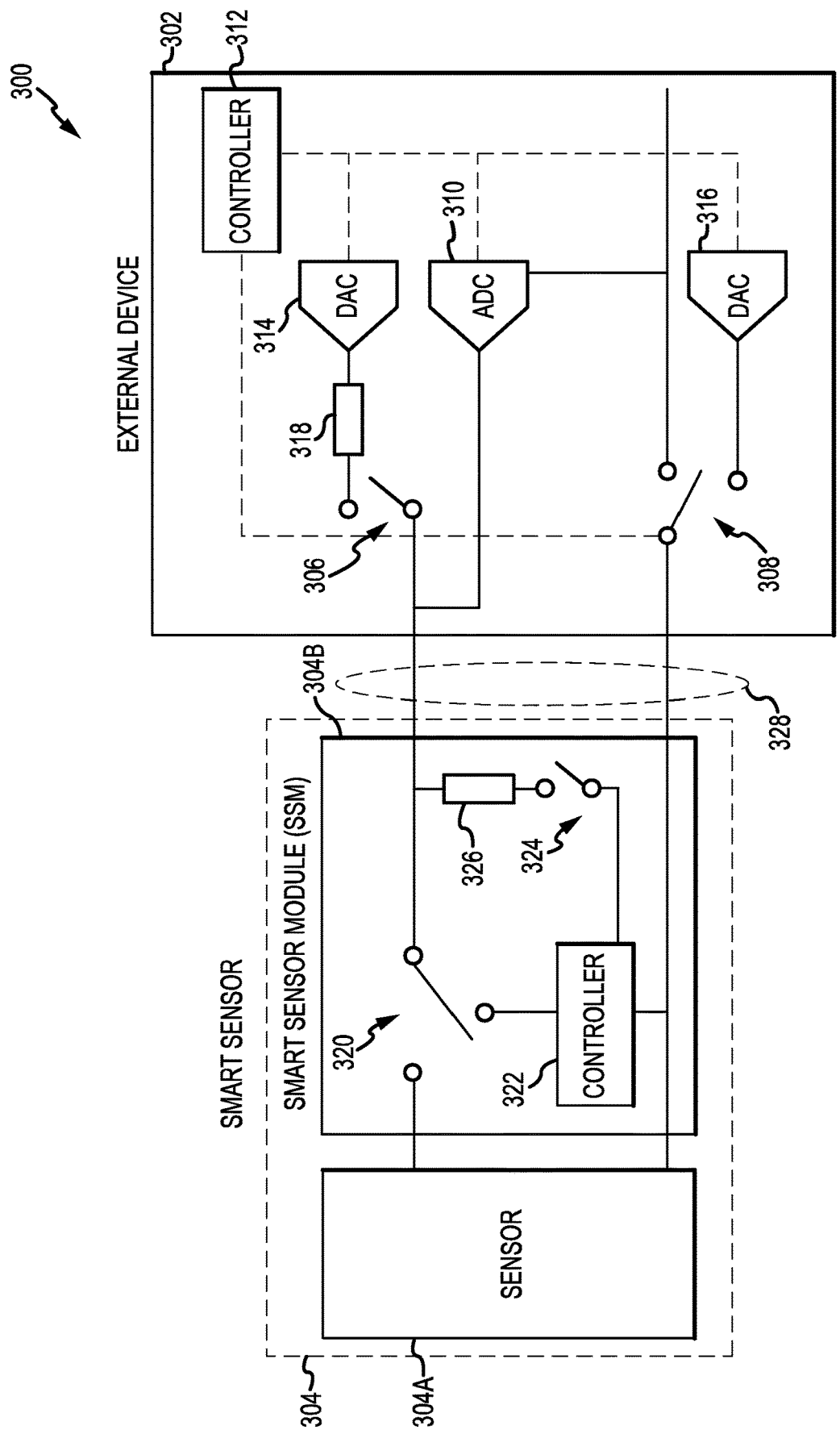
FIG. 3 illustrates an overview of an example smart sensor technology system.

FIG. 3 illustrates an overview of an example smart sensor technology system 300. Smart sensor technology system 300 comprises external device 302 and smart sensor 304. As illustrated in dotted oval 328, external device 302 and smart sensor 304 are connected using two connectors. While smart sensor 304 is illustrated as having two connectors, it will be appreciated that smart sensor 304 may be implemented using more than two connectors without departing from the spirit of this disclosure. In another example, external device 302 and smart sensor 304 may be indirectly connected, rather than directly connected as illustrated in FIG. 3.

In an example, external device 302 may be external device 108 in FIG. 1A. External device 302 may comprise switches 306 and 308, which may be used by controller 312 to configure connectors 328 of smart sensor 304 for various operating states. As illustrated, when switch 306 is open and switch 308 is in a first position, the output of smart sensor 304 is connected to ADC 310. ADC 310 may be used to digitize and/or amplify output received from smart sensor 304, which may then be provided to controller 312 for further processing. In an example, switch 306 may be closed and switch 308 may be configured in a second position, such that connectors 328 are connected to DACs 314 and 316, and sense resistor 318. In this configuration, controller 312 may be able to communicate with and/or receive communication from controller 322 of smart sensor 304. While example components have been discussed with respect to external device 302, it will be appreciated that additional, fewer, or alternative components may be used to interface with and configure the connection between external device 302 and smart sensor 304.

Smart sensor 304 may comprise sensor 304A and smart sensor module 304B. While sensor 304A is illustrated as being connected to smart sensor module 304B using two connectors, it will be appreciated that, in an alternative example, additional connectors may be used to connect sensor 304A to smart sensor module 304B. In the illustrated example, smart sensor module 304B uses switch 320 to provide multiple operating states of smart sensor 304. In a first position, switch 320 connects sensor 304A to external device 302, thereby providing a pass-through operating state in which sensor 304A is indirectly connected to external device 302 by way of smart sensor module 304B. In this operating state, the controller 322 and its associated circuitry in the smart sensor module 304B are completely bypassed so that electrically, as far as the external device 302 is concerned, only the sensor 304A is connected (that is, although there may be minor effect on the sensor signal due to the smart sensor module, that effect is not sufficiently significant to interfere with the external device's ability to utilize the signal). In this state, the smart sensor 304 operates the same as a circuit that only includes a sensor 304A without a smart sensor module 304B. This allows existing sensors 304A to be replaced with a smart sensor 304 version of the same type or a smart sensor module 304B to be introduced between an existing sensor 304A in a pre-existing electrical system without changing the operation of the electrical system.

The smart sensor 304 is in the communication state when switch 320 is positioned to connect the controller, thus electrically bypassing the sensor 304A. In this position, controller 322 is electrically connected to and can communicate with controller 312 of external device 302, which will be discussed in greater detail below.

Switch 320 may be switched to power the controller circuit according to aspects disclosed herein. In an example, switch 320 may be a FET that may be switched by applying a voltage that is outside of the normal operating range for sensor 304A, as discussed in greater detail with reference to FIG. 5. Applying the voltage may be achieved by configuring DACs 314 and 316 of external device 302 accordingly. As an example, DAC 314 may be configured to provide +4V while DAC 316 may be configured to provide 0V, or vice versa. As a result of switching to power the controller 322, it is now possible to communicate with controller 322. In an embodiment, the controller 322 automatically transmits information over the two connectors 328 to the external device 302 as a result of receiving power. In an alternative embodiment, communication with controller 322 may be achieved by modulating the voltage applied by DACs 314 and 316. In this embodiment, the controller 322 may detect and interpret the voltage modulations and, in response, transmit certain information to the external device 302.

In another example, controller 322 may close normally-open load switch 324, thereby completing the circuit and connecting load resistor 326 to connectors 328. As a result of opening and closing load switch 324, controller 322 may modulate the current draw on the voltage applied by external device 302. The modulated current may be detected by controller 312 using sense resistor 318 in conjunction with ADC 310. As a result, it may be possible for smart sensor 304 to engage in unidirectional communication with external device 302. In some examples, aspects of the above unidirectional communication techniques may be combined in order to achieve bidirectional communication among external device 302 and smart sensor 304. While specific communication techniques are discussed above, it will be appreciated that similar or different aspects of the connection between external device 302 and smart sensor 304 may be modulated or otherwise used by either or both external device 302 and smart sensor 304 without departing from the spirit of this disclosure.

In some examples, smart sensor module 304B may omit switch 320, such that controller 322 and sensor 304A are both connected to connectors 328. As an example, sensor 304A may only operate in certain conditions, such that controller 322 may be communicable in other conditions. In another example, sensor 304A may have a high impedance, thereby enabling communication with controller 322 regardless of whether a signal from sensor 304A is present. Accordingly, while aspects disclosed herein may describe a switch able to provide multiple operating states, it will be appreciated that multiple operating states may be provided without the use of a switch.

Figure 4:
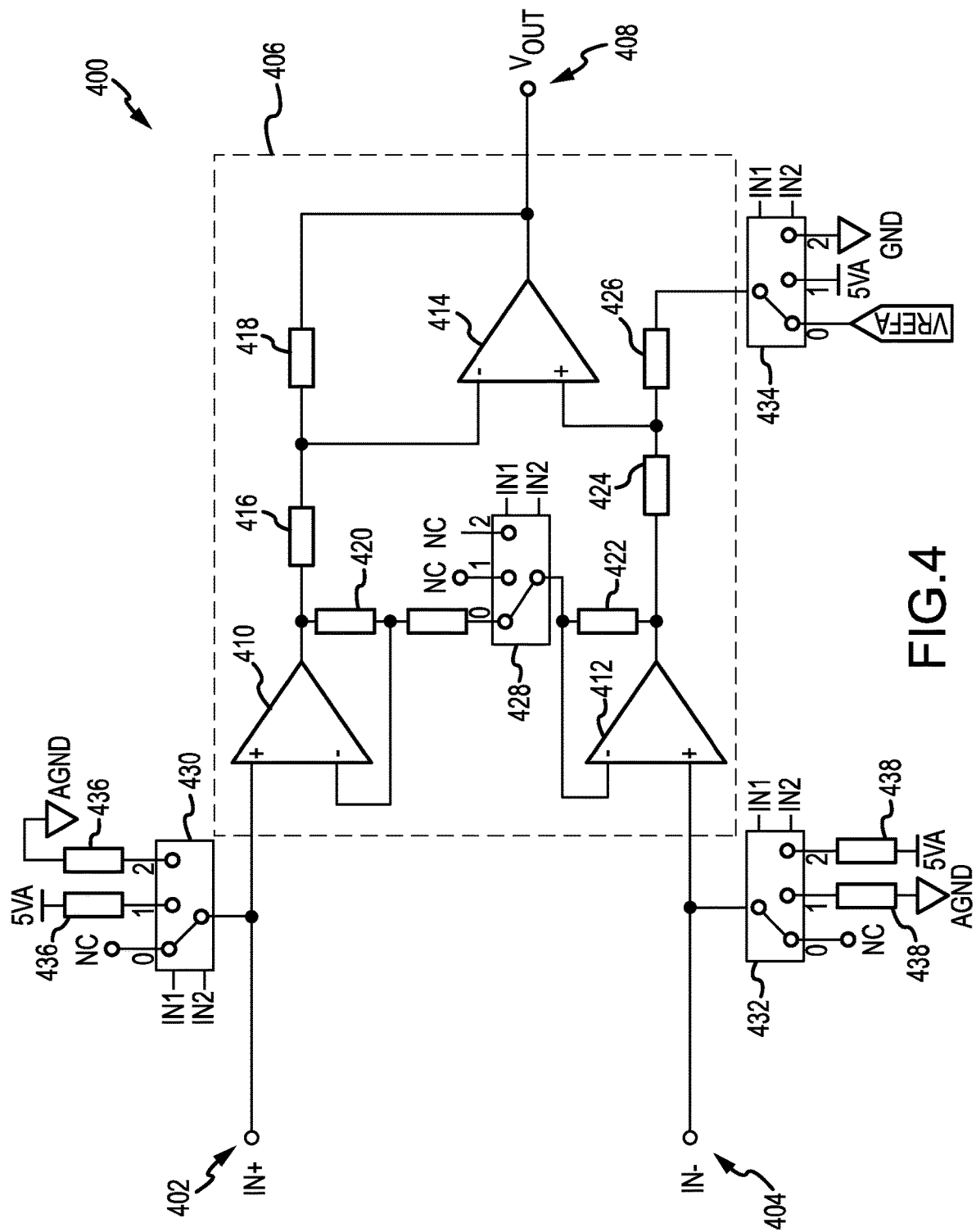
FIG. 4 illustrates an overview of an example circuit for interfacing with a smart sensor.

FIG. 4 illustrates an overview of an example circuit 400 for interfacing with a smart sensor module. In an example, circuit 400 may be a part of external device 108 in FIG. 1A or external device 302 in FIG. 3. In another example, circuit 400 may be implemented as part of a computing device, meter device, hub device, or other kind of device. As illustrated, circuit 400 comprises two connectors 402 and 404, labeled "IN+" and "IN−" respectively, which connect to the two connectors from a smart sensor module. Connectors 402 and 404 may be electrically connected to one or more smart sensors. While circuit 400 is illustrated as using a two connector example of a smart sensor module, it will be appreciated that additional connectors may be used without departing from the spirit of this disclosure.

Connectors 402 and 404 are connected to instrumentation amplifier 406, the output of which may be provided as $V_{out}$ 408. In an example, $V_{out}$ may be provided to an ADC (not pictured) for further processing. As illustrated, instrumentation amplifier 406 is comprised of operational amplifiers 410, 412, and 414, as well as resistors 416, 418, 420, 422, 424, and 426. While an example instrumentation amplifier is provided in circuit 400, it will be appreciated that other amplifier components and/or processing circuits may be provided and used to process information received from connectors 402 and 404. As illustrated, instrumentation amplifier 406 also comprises switch 428, which, in conjunction with switch 434, may be used to adjust the amplification and bias that is applied to connectors 402 and 404. Switches 428 and 434 may have several different positions determined based on the value of "IN1" and "IN2." As illustrated, the values for both IN1 and IN2 are a digital zero, thereby causing the circuit 400 to be in a configuration in which instrumentation amplifier 406 may provide normal amplification with no bias. Specifically, switch 428 is in position "0," thereby completing the circuit between operational amplifiers 410 and 412, and switch 434 is connected to VREFA. Additional switch positions will be discussed in greater detail below with respect to switches 428 and 434, as well as switches 430 and 432.

Circuit 400 may also comprise switches 430 and 432. Switches 430 and 432 may be used to configure the connection between circuit 400 and a smart sensor module.

Similar to switches 428 and 434, switches 430 and 432 have several positions, each of which may be determined based on the values of the same signals IN1 and IN2 used in switch 428 above. As illustrated, when the values of IN1 and IN2 are both zero, both of switches 430 and 432 are not connected. When the value of IN1 is a digital one and the value of IN2 is zero, each of switches 428-434 may be in the "1" position, such that switch 428 is open with respect to the circuit between operational amplifiers 410 and 412, switch 434 provides a 5V bias, switch 430 provides +5V to wire 402, and switch 432 is connected to analog ground. As a result, a smart sensor module connected to connectors 402 and 404 may receive +5V. In an example, this may cause the smart sensor module (e.g., smart sensor module 304B in FIG. 3) to enter an alternate operating state (e.g., a communication operating state, such that the controller of the smart sensor may be connected or otherwise communicable). Accordingly, the bias introduced at switch 434 may be used in conjunction with operational amplifier 414 to provide signals received from the smart sensor to $V_{out}$, which in turn may be processed by an ADC (not pictured).

In another example, IN1 may be zero and IN2 may be one, thereby configuring the instrumentation amplifier to provide no amplification, as a result of now-open switch 428. Switch 434 may be connected to ground, thereby providing a 0V bias to operational amplifier 414. Switches 430 and 432 may be in a reversed polarity configuration, such that switch 430 connects wire 402 to analog ground and switch 432 connects wire 404 to +5V. In an example, this allows the circuit 400 to identify when the smart sensor module has been installed with the connectors reversed. In an example, the controller may still be connected or otherwise accessible to circuit 400 by way of a rectifier bridge in the smart sensor module, which will be discussed in greater detail below with respect to FIG. 5. In another example, upon identifying the reversed connectors, a smart sensor module may automatically enter a locate operating state, wherein a buzzer or LED may be activated to indicate the position of the smart sensor module and/or provide an indication as to the reversed polarity.

In an example, the various amplification and bias modes of instrumentation amplifier 406, in conjunction with switches 428 and 434, may be used to adapt to one or more differences that may exist between the operating states of a smart sensor. As an example, instrumentation amplifier 406 may provide amplification and no bias when the smart sensor module is in a pass-through state, because the sensor to which the smart sensor module is connected may require amplification. In another example, instrumentation amplifier 406 may provide no amplification and a 5V bias in order to adjust for the voltage that is provided to the smart sensor module by switches 430 and 432 when they are in position "1." Accordingly, while FIG. 4 is discussed with respect to several example configurations provided by circuit 400, it will be appreciated that additional, fewer, or alternate configurations may be provided in other examples (e.g., additional amplification may be provided, different biases may be used, different voltages may be applied, etc.).

Figure 5:
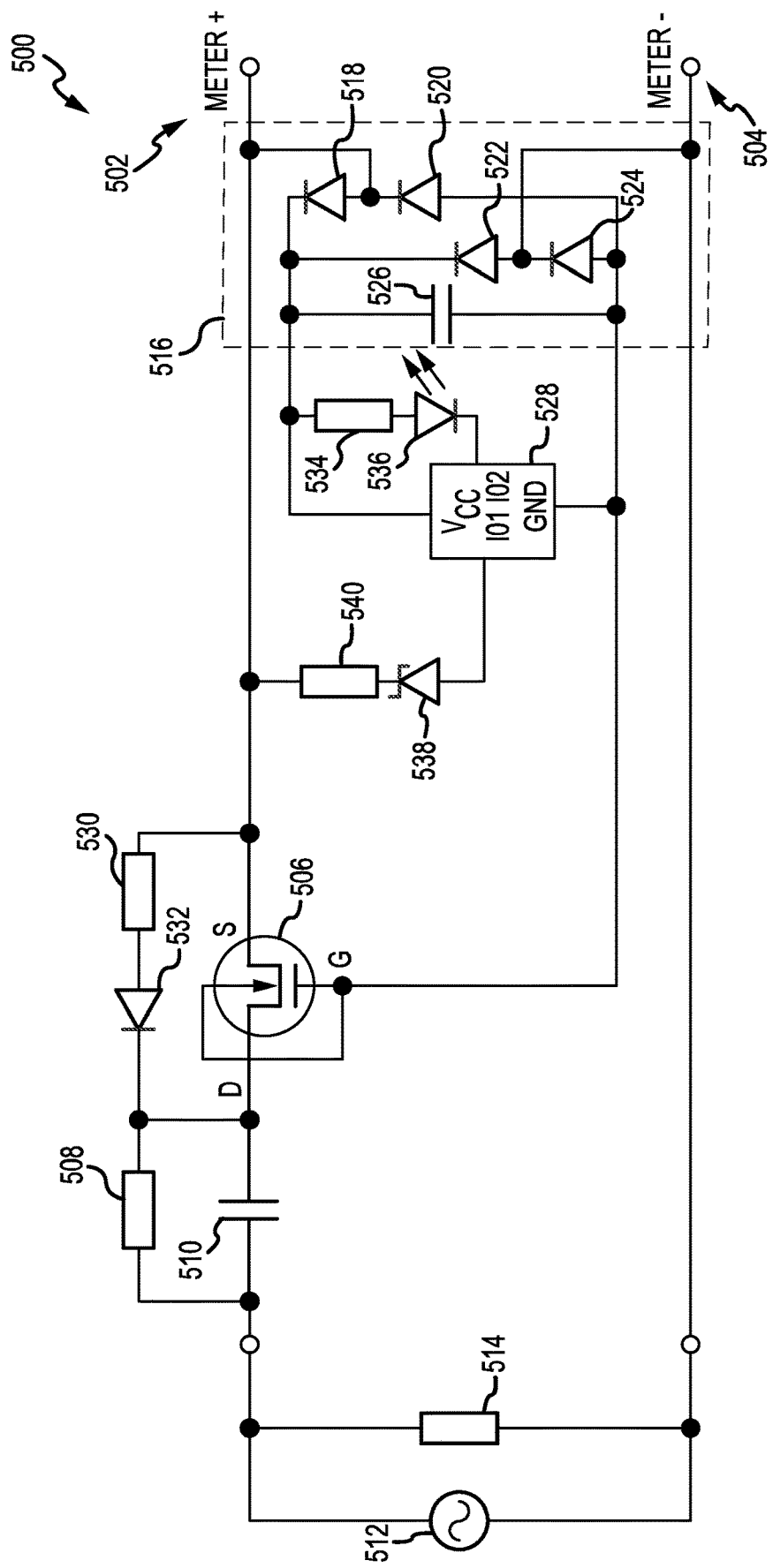
FIG. 5 illustrates an overview of an example circuit for a smart sensor module.

FIG. 5 illustrates an example of a more detailed embodiment of a circuit 500 for a smart sensor module. Circuit 500 may be one of smart sensor modules 102-106 in FIG. 1A and/or smart sensor 304 in FIG. 3. Circuit 500 is comprised of connectors 502 and 504, each of which may interface with or otherwise be connectable to the connectors of an external device (e.g., an external device implementing circuit 400 in FIG. 4). Circuit 500 comprises sensor 512. In an example, sensor 512 may be an unpowered sensor. As illustrated, sensor 512 and burden resistor 514 are connected to connectors 502 and 504 by switch 506, which is in a first position. In some examples, burden resistor 514 may be omitted or included depending on the type of sensor 512 (e.g., if sensor 512 may produce a current). In an example, switch 506 may be a depletion-mode FET, such that the FET is on at a zero gate-source voltage, which may be the case when sensing an unpowered sensor. An unpowered sensor may be a current sensor, a temperature sensor, a light sensor, a microphone, or a flow sensor, among other sensors. Discharge resistor 508 and coupling capacitor 510 may be used to isolate direct current voltage from the low impedance of sensor 512 and/or of burden resistor 514. In some examples, discharge resistor 508 and coupling capacitor 510 may not be necessary. As an example, discharge resistor 508 and coupling capacitor 510 may be used in applications having alternating current.

Rectifier bridge 516 may be used to ensure that, when circuit 500 is powered (that is, the external device has applied a voltage across the connectors 502 and 504 sufficient to switch the FET 506 into the alternate operating state position), aspects of circuit 500 (e.g., controller 528, LED 536, etc.) may receive power regardless of the polarity with which an external device interfaces with circuit 500. As illustrated, rectifier bridge 516 comprises diodes 518-524 and supply capacitor 526. Rectifier bridge 516 is connected to controller 528, which, as a result of rectifier bridge 516, may be powered regardless of the polarity with which circuit 500 is connected to an external device. While controller 528 is illustrated as having four connectors (e.g., Vcc, GND, IO1, and IO2), it will be appreciated that a controller having additional, fewer, or different connectors may be used. In an example, when voltage is applied to connectors 502 and 504, the gate-source voltage of switch 506 may be non-zero, thereby causing switch 506 to change position and disconnect sensor 512 and resistor 514 from the circuit. Resistor 530 and charge diode 532 may be used to maintain the position of switch 506 by mitigating a voltage difference that may otherwise exist between the source and the drain of switch 506. In some examples, LED 536 and resistor 534 may be used by controller 528 when circuit 500 is in a locate operating state. In other examples, Zener diode 538 and load resistor 540 may be used to communicate with an external device by modulating the current draw on connectors 502 and 504.

In an example, connectors 502 and 504 may be connected to an external device in a configuration having reversed polarity. The voltage may cause switch 506 to change position, thereby disconnecting sensor 512. The IO1 pin of controller 528 may be used to determine the polarity of voltage received at connectors 502 and 504. Based on the polarity determination, controller 528 may use pin IO2 to activate LED 536, thereby entering a locate operating state as discussed above to indicate a reversed connection. As will be appreciated, LED 536 is provided as an example of an indicator and other indicators (e.g., a buzzer, an electrical output, etc.) may be used instead of or in addition to LED 536. In another example, voltage may be applied to connectors 502 and 504 having a correct polarity. The voltage may cause switch 506 to change position, thereby disconnecting sensor 512. Circuit 500 may enter a unidirectional communication operating state, wherein controller 528 may be powered and may transmit information using pin IO1 to modulate the current draw using Zener diode 538 and load resistor 540. Zener diode 538 may be used to ensure that the gate-source voltage at switch 506 does not drop below a certain level, which may cause the position of switch 506 to revert, thereby interrupting data transmission and reconnecting sensor 512. In another example, rather than or in addition to using Zener diode 538, an external device may monitor the voltage and compensate or otherwise adjust for potential voltage fluctuations. While example operating states and configurations have been discussed above with respect to circuit 500, it will be appreciated that circuit 500 may be implemented using alternate circuitry, configuration techniques, and/or operating states.

Figure 6:
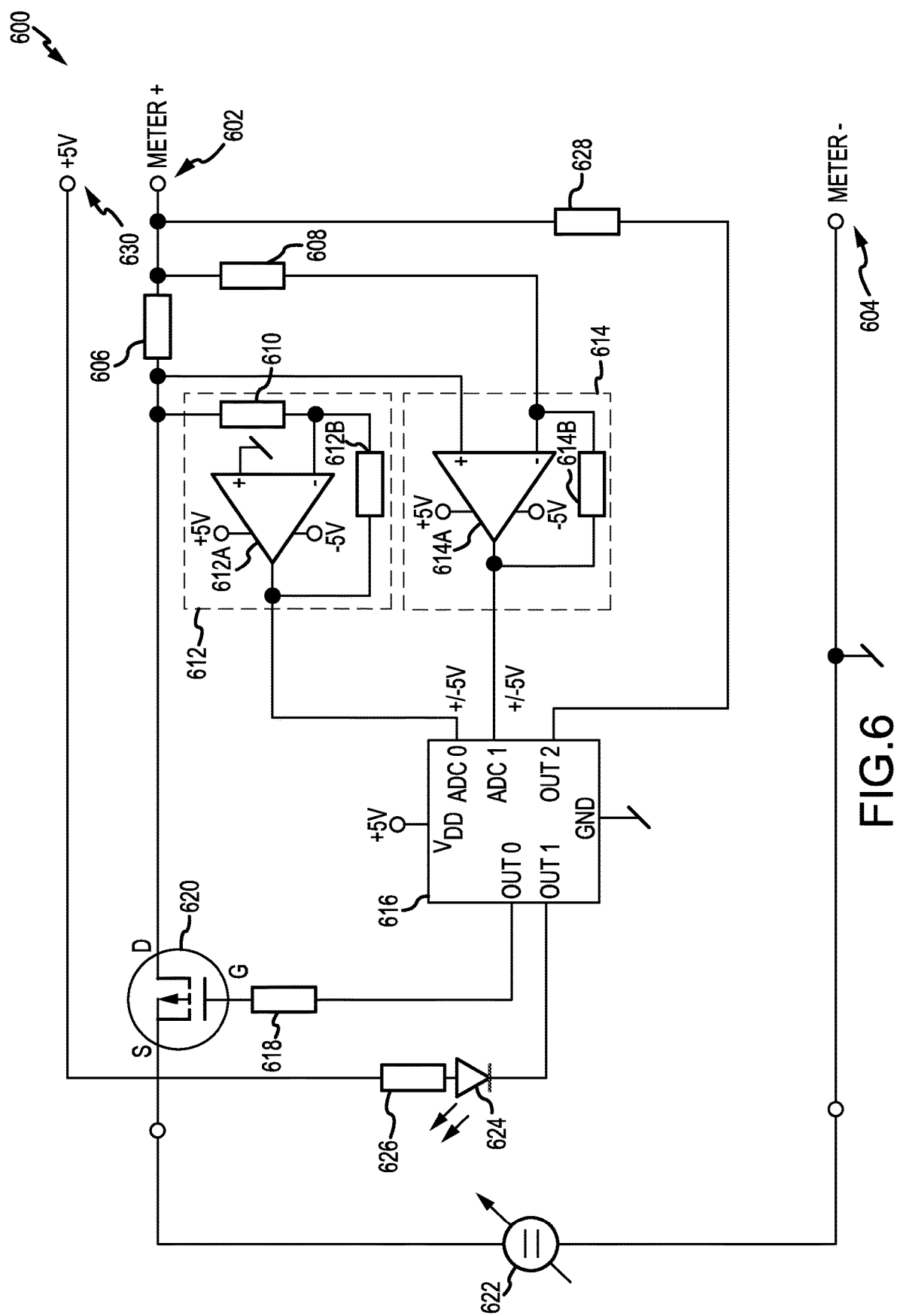
FIG. 6 illustrates an overview of an example circuit for a smart sensor module.

FIG. 6 illustrates an overview of an example circuit 600 for a smart sensor module. Circuit 600 is comprised of connectors 602, 604, and 630, each of which may interface with or otherwise be connectable to the connectors of external device (e.g., an external device implementing circuit 400 in FIG. 4). As illustrated, connector 630 provides +5V, while connector 604 may serve as ground. In some examples, a fourth connector may be used in conjunction with connector 630 to provide power to circuit 600. Circuit 600 comprises sensor 622. In an example, sensor 622 may be a powered sensor or may be a sensor operating with direct current. Sensor 622 may be connected to connectors 602 and 604 by switch 620 when switch 620 is in a first position. In an example, switch 620 may be a FET, such that the FET connects sensor 622 when a high signal is received from controller 616 on OUT0. While controller 616 is illustrated as having seven connectors (e.g., Vdd, GND, ADC0, ADC1, OUT0, OUT1, and OUT2), it will be appreciated that a controller having additional, fewer, or different connectors may be used.

Circuit 600 is also comprised of voltage sense amplifier 612 and current sense amplifier 614. As illustrated, voltage sense amplifier 612 is comprised of operational amplifier 612A and resistor 612B. Voltage sense amplifier 612 may be used in conjunction with resistor 610 to measure determine the output voltage of connectors 602 and 604. Current sense amplifier 614 is comprised of operational amplifier 614A and resistor 614B. Current sense amplifier 614 may be used in conjunction with resistor 608 to determine the current through sense resistor 606. In some examples, controller 616 may continually or periodically sample the voltage and current as determined by voltage sense amplifier 612 and current sense amplifier 614, respectively. As illustrated, the ADC0 connector of controller 616 may be used to receive voltage information and the ADC1 connector of controller 616 may be used to receive current information. Controller 616 may use the received voltage and current information to determine the output resistance.

In an example, if the output resistance is above a threshold, controller 616 may provide a high signal on OUT0 to switch 620 by way of resistor 618, thereby placing switch 620 in a first position, wherein sensor 622 is connected, as was discussed above. In another example, if the output resistance is below the threshold, controller 616 may provide a low signal on OUT0 to switch 620, thereby causing switch 620 to change position and disconnect sensor 622. It will be appreciated that controller 616 may position switch 620 based on reversed criteria (such that the high signal is output when the output resistance is below a threshold, etc.) and/or based on other criteria (e.g., voltage, current, impedance, etc.).

Controller 616 may enter a plurality of operating states. In an example, controller 616 may use connector OUT1 to activate LED 624 in conjunction with resistor 626, thereby entering a locate operating state. The locate operating state may be entered based on a determination of reversed polarity or a specific determined output resistance level, among other factors. In another example, controller 616 may use connector OUT2 in conjunction with load resistor 628 to transmit data according to aspects disclosed herein, thereby entering a unidirectional communication operating state. The unidirectional communication operating state may be entered based on a specific determined output resistance level, a specific voltage level, or some other factors. In some examples, controller 616 may use one or more of voltage sense amplifier 612 and current sense amplifier 614 to receive information as may be transmitted by an external device using connectors 602 and 604. While example operating states, configuration techniques, and circuit components have been discussed above with respect to circuit 600, it will be appreciated that any of a variety of other circuit components may be used to implement a smart sensor as described herein, having any number of operating states activated based on one or more of a wide array of possible factors.

Figure 7:
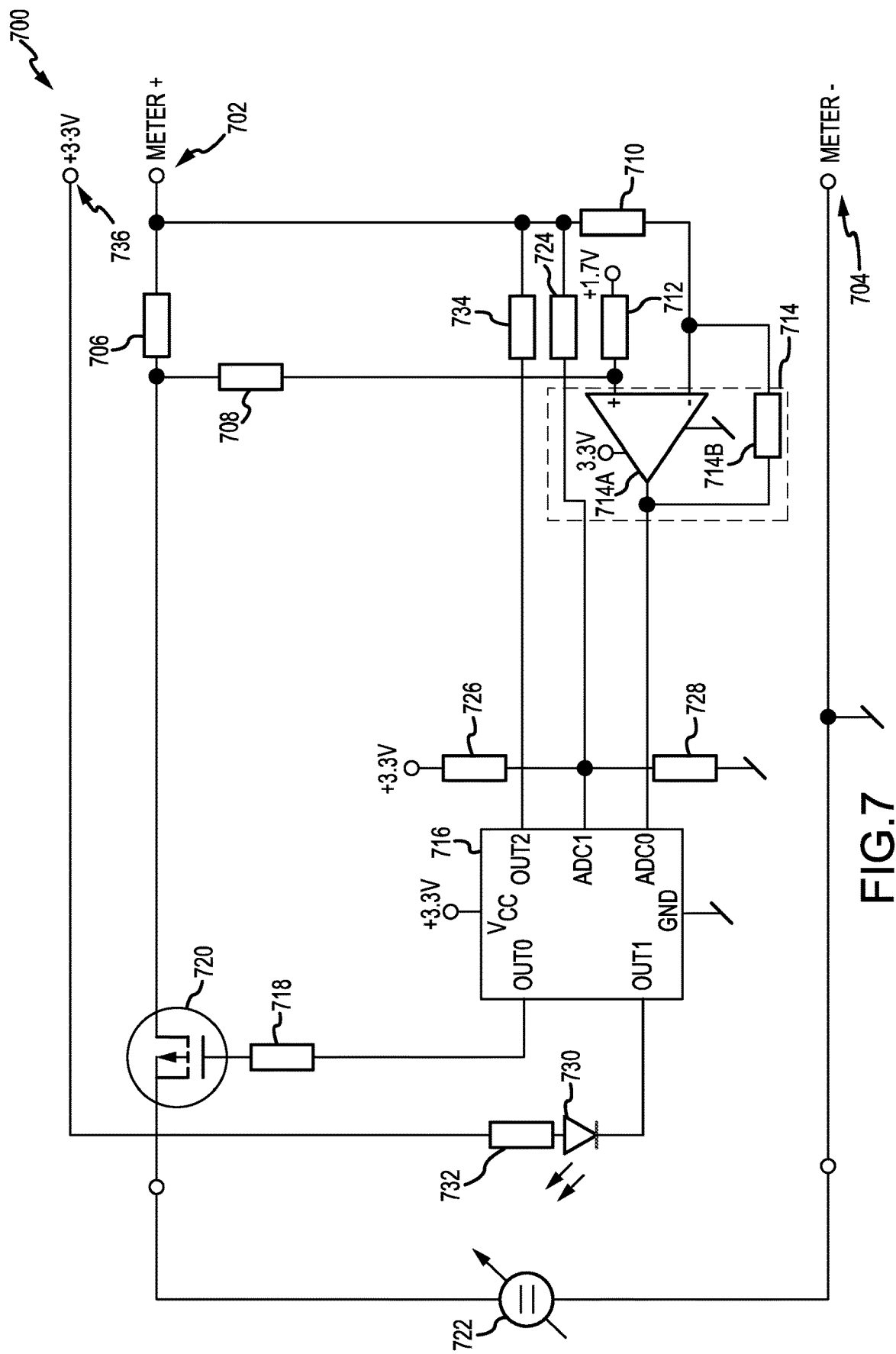
FIG. 7 illustrates an overview of an example circuit for a smart sensor module.

FIG. 7 illustrates an overview of an example circuit 700 for a smart sensor module. Circuit 700 is comprised of connectors 702, 704, and 736, each of which may interface with or otherwise be connectable to an external device (e.g., an external device implementing circuit 400 in FIG. 4). As illustrated, connector 736 provides +3.3V, while connector 704 may serve as ground. In some examples, a fourth connector may be used in conjunction with connector 736 to provide power to circuit 700. Circuit 700 comprises sensor 722. In an example, sensor 722 may be a powered sensor or may be a sensor operating using direct current. Sensor 722 may be connected to connectors 702 and 704 by switch 720 when switch 720 is in a first position. In an example, switch 720 may be a FET, such that the FET connects sensor 722 when a high signal is received from controller 716 on OUT0 by way of resistor 718. While controller 716 is illustrated as having seven connectors (e.g., Vcc, GND, ADC0, ADC1, OUT0, OUT1, and OUT2), it will be appreciated that a controller having additional, fewer, or different connectors may be used.

Circuit 700 is also comprised of current sense amplifier 714. As illustrated, current sense amplifier 714 is comprised of operational amplifier 714A and resistor 714B. Current sense amplifier 714 may be used in conjunction with resistors 708, 710, and 712 to determine the current through sense resistor 706. In some examples, controller 716 may continually or periodically sample the current as determined by current sense amplifier 714, respectively. As illustrated, the ADC0 connector of controller 716 may be used to receive current information. Controller 716 may receive voltage information using the ADC1 connector, as conditioned by resistors 724, 726, and 728. Controller 716 may use the received voltage and current information to determine the output impedance.

In an example, if the output impedance is above a threshold, controller 716 may provide a high signal on OUT0 to switch 720, thereby placing switch 720 in a first position, wherein sensor 722 is connected, as was discussed above. In another example, if the output impedance is below the threshold, controller 716 may provide a low signal on OUT0 to switch 720, thereby causing switch 720 to change position and disconnect sensor 722. It will be appreciated that controller 716 may position switch 720 based on reversed criteria (such that the high signal is output when the output impedance is below a threshold, etc.) and/or based on other criteria (e.g., based on resistance, voltage, current, etc.).

Controller 716 may enter a plurality of operating states. In an example, controller 716 may use connector OUT1 to activate LED 730 in conjunction with resistor 732, thereby entering a locate operating state. The locate operating state may be entered based on a determination of reversed polarity or a specific determined output impedance level, among other factors. In another example, controller 716 may use connector OUT2 in conjunction with load resistor 734 to transmit data according to aspects disclosed herein, thereby entering a unidirectional communication operating state. The unidirectional communication operating state may be entered based on a specific determined output impedance level, a specific voltage level, among other factors. In some examples, controller 716 may use current sense amplifier 714 to receive information as may be transmitted by an external device using connectors 702 and 704. While example operating states, configuration techniques, and circuit components have been discussed above with respect to circuit 700, it will be appreciated that any of a variety of other circuit components may be used to implement a smart sensor as described herein, having any number of operating states activated based on one or more of a wide array of possible factors.

FIGS. 8A-8C illustrate overviews of an example user interface for interacting with smart sensor technology. Aspects of the user interface may be provided as part of a website, a configuration application, or a mobile device, a meter device, among other smart sensor devices or management utilities. With respect to FIG. 8A, user interface 800 may comprise a user interface having a one or more rows and columns. In an example, the columns of user interface 800 comprise checkbox column 802, identifier column 804, model column 806, last scanned column 808, and blink LED column 810. While example columns are described herein with respect to FIGS. 8A-8C, it will be appreciated that user interface 800 may display additional information, alternative information, or less information as compared to instant examples. The rows of user interface 800 may each correspond to or be associated with a smart sensor as described herein.

In an example, one or more checkboxes in checkbox column 802 may be checked, such that when Scan Checked CTs button 812 is pressed, one or more smart sensor modules associated with the one or more checkboxes may be scanned, as will be discussed below in greater detail with respect to FIGS. 8B and 8C. Identifier column 804 may display an identifier associated with a smart sensor module, such as a port number (e.g., indicating a port of a device to which a smart sensor module is connected), a sensor number, or other identifier. Model column 806 comprises information relating to a model of the smart sensor, including a hardware model number, hardware revision, or other information. Last scanned column 808 displays information relating to when the smart sensor was last scanned or when information was last received from a controller of the smart sensor. Finally, blink LED column 810 comprises a button or other user interface element that may be used to configure a smart sensor to enter a locate operating state, according to aspects disclosed herein.

As shown in user interface 800, the first six checkboxes in checkbox column 802 are selected, thereby indicating that a smart sensor module associated with each checkbox should be scanned as a result of pressing Scan Checked CTs button 812. With reference to user interface 820 in FIG. 8B, the display is updated to indicate scanning progress and to include additional information that is received or generated as a result of performing the scanning process. As an example, row 822 comprises a checkmark to indicate that a smart sensor module was identified, model information associated with the smart sensor ('J&D JMN 21 mm/0.83" 100A'), and a last scanned date. Row 824 indicates that the smart sensor module having an identifier of "4" is being scanned. In an example, scanning may comprise initiating a first communication session with a smart sensor module and, when a response is not received (e.g., in a predetermined amount of time, conforming to a certain protocol, etc.), altering one or more scanning parameters and retrying the scan. As an example, a scan may begin with an initial polarity and, if no response is received, may be retried using a different polarity. It will be appreciated that other factors may be varied, including, but not limited to, an applied voltage or the communication protocol that is used. User interface 820 also comprises Cancel Scan button 826, which may cause the scan to be cancelled, paused, or rescheduled, among other actions.

FIG. 8C illustrates user interface 840, which is displayed once a scan has completed. Row 842 is expanded to display more information associated with or received from the smart sensor module and/or sensor. As illustrated, specifications, connection information, and manufacturing specific data may be displayed in model cell 846. Additionally, information displayed in calibration table 848 may have been received as a result of performing the scan operation. Calibration table 848 comprises information that may be used by an external device (e.g., a meter device, computing device, etc.) when interpreting or processing information received from the sensor of the smart sensor module. Finally, row 844 comprises a red "X" to indicate that a smart sensor module having an identifier of "6" was not identified during the scan. This may indicate that no smart sensor module is connected or was identified as being connected to port six of a device. While example user interface elements, display information, and other user experience techniques have been discussed with respect to FIGS. 8A-8C, it will be appreciated that a user interface for interacting with smart sensor technology may be implemented using any of a variety of techniques.

As will be understood from the foregoing disclosure, aspects of the disclosed technology relate to one or more of the following clauses.

1. A system comprising: a first smart module connector and a second smart module connector, the first and second smart module connectors being electrical conductors that can be connected to an external device; a sensor comprising a first sensor connector and a second sensor connector, wherein the second sensor connector is connected to the second smart module connector, and wherein the first sensor connector is connected to the first smart module connector when the system is in a first state, thereby enabling the sensor to communicate information generated by the sensor to a connected external device using at least one of the first smart module connector and the second smart module connector; and a smart module having a controller, wherein the controller is connected to the second smart module connector, and wherein the controller is connected to the first smart module connector when the system is in a second state, such that the controller can communicate with a connected external device using the first smart module connector and the second smart module connector when the system is in the second state.

2. The system of clause 1, further comprising a switch having at least a first switch state and a second switch state, wherein the first switch state is associated with the first state and the second switch state is associated with the second state.

3. The system of clause 2, wherein the switch, in the first switch state, causes the first sensor connector to be electrically connected to the first smart module connector and causes the controller to be electrically disconnected from the first smart module connector.

4. The system of any one of clauses 2-3, wherein the switch, in the second switch state, causes the first sensor connector to be electrically disconnected from the first smart module connector and causes the controller to be electrically connected to the first smart module connector.

5. The system of any one of clauses 2-4, wherein the switch is changeable from the first switch state to the second switch state based on the voltage applied to the switch.

6. The system of any one of clauses 2-5, wherein the switch is a field-effect transistor having a gate pin, a source pin, and a drain pin.

7. The system of clause 6, further comprising a resistor and a charge diode connected in series between the source pin of the field-effect transistor and the drain pin of the field-effect transistor.

8. The system of any one of clauses 1-7, further comprising at least one indicator connected to the controller.

9. The system of clause 8, wherein the indicator is a light-emitting diode.

10. The system of clause 8, wherein the indicator is a buzzer.

11. The system of any one of clauses 1-10, wherein the system is integrated into a single physical component.

12. The system of any one of clauses 1-11, further comprising a bridge rectifier connected to the first smart module connector and the second smart module connector.

13. The system of any one of clauses 1-12, further comprising a detection means useable by the controller to detect at least one of a voltage and a current for the first smart module connector and the second smart module connector.

14. The system of any one of clauses 1-13, further comprising a discharge resistor and coupling capacitor operative to isolate direct current voltage from the sensor.

15. The system of any one of clauses 1-14, further comprising a modulation means useable by the controller to modulate at least one of a voltage and a current for the first smart module connector and the second smart module connector when the system is in the second state.

16. The system of clause 15, wherein the modulation means comprises a load resistor.

17. The system of any one of clauses 15-16, wherein the modulation means comprises a Zener diode, useable to maintain the voltage across the first smart module connector and the second smart module connector above a threshold.

18. The system of any one of clauses 1-17, wherein the sensor is an unpowered sensor.

19. The system of any one of clauses 1-17, wherein the sensor is a powered sensor.

20. A method for communicating with a smart sensor comprising: receiving a selection of a normal operating state for the smart sensor; in response to the selection of the normal operating state, adapting a first lead and a second lead of the smart sensor to the sensing state; receiving, using the first lead and the second lead, information from a sensor of the smart sensor; generating digital output based on the received information; receiving a selection of a controller state for the smart sensor; in response to the selection of the controller state, adapting the first lead and the second lead of the smart sensor to the controller state; and communicating, using the first lead and the second lead, with a controller of the smart sensor.

21. The method of clause 20, wherein adapting the first lead and the second lead of the smart sensor between the sensing state and the controller state comprises adjusting a voltage applied to the first lead and the second lead.

22. The method of clause 20, wherein adapting the first lead and the second lead of the smart sensor between the sensing state and the controller state comprises adjusting an impedance between the first lead and the second lead.

23. The method of clause 20, wherein adapting the first lead and the second lead of the smart sensor between the sensing state and the controller state comprises adjusting a current through the first lead and the second lead.

24. The method of any one of clauses 20-23, wherein communicating with the controller further comprises: initiating a first communication session with the controller; after a period of time, determining no response has been received during the first communication session; when it is determined no response has been received, adapting the first lead and the second lead of the smart sensor to a second controller state; and initiating a second communication session with the controller.

25. The method of clause 24, wherein adapting the first lead and the second lead of the smart sensor to the second controller state comprises a different polarity for the first lead and the second lead than the controller state.

26. The method of any one of clauses 20-25, wherein communicating with the controller comprises modulating at least one of a voltage and a current of the first lead and the second lead.

27. The method of any one of clauses 20-26, wherein receiving information from the sensor comprises receiving information from the sensor during the sensing state.

28. The method of any one of clauses 20-26, wherein communicating with the controller comprises receiving information by detecting a modulation of at least one of a voltage and a current of the first lead and the second lead during the controller state.

29. The method of any one of clauses 20-28, further comprising: receiving a selection of a locate state for the smart sensor; and in response to the selection of the locate state, adapting the first lead and the second lead of the smart sensor to a locate state.

30. The method of clause 29, wherein adapting the first lead and the second lead of the smart sensor to the locate state comprises adjusting a voltage applied to the first lead and the second lead to a different voltage than for the normal operating state and the controller state.

31. The method of clause 29, wherein adapting the first lead and the second lead of the smart sensor to the locate state comprises adjusting an impedance applied to the first lead and the second lead to a different impedance than for the normal operating state and the controller state.

32. The method of clause 29, wherein adapting the first lead and the second lead of the smart sensor to the locate state comprises adjusting a current through the first lead and the second lead to a different current than for the normal operating state and the controller state.

33. A system comprising: a first connector and a second connector, each configured to accept a connector of a smart sensor having at least two operating states; a first switch and a second switch, each having at least a first state and a second state, wherein the first state is associated with a first operating state of the smart sensor, and the second state is associated with the second operating state of the smart sensor; a controller connected to the first connector and the second connector; and a power source that, when the first switch and the second switch are in the first state, is disconnected from at least one of the first connector and the second connector, and, when the first switch and the second switch are in the second state, is connected to the first connector and the second connector.

34. The system of clause 33, wherein the first switch and the second switch are controllable by the controller, such that the controller may change the state of the first switch and the second switch.

35. The system of any one of clauses 33-34, further comprising an instrumentation amplifier connected to the first connector and the second connector, the output of which is connected to the controller.

36. The system of clause 35, wherein the instrumentation amplifier is operable to receive information from the smart sensor when the smart sensor is in the first operating state.

37. The system of any one of clauses 33-36, further comprising a detection means useable by the controller to detect at least one of a voltage and a current for the first connector and the second connector.

38. The system of clause 37, wherein the detection means comprises a sense resistor and an operational amplifier.

39. The system of any one of clauses 33-38, further comprising a modulation means useable by the controller to modulate at least one of a voltage and a current for the first connector and the second connector when the smart sensor is in the second state.

40. The system of clause 39, wherein the modulation means comprises a load resistor.

41. The system of any one of clauses 33-40, wherein the first switch and the second switch each have a third state, such that the power source is connected to the first connector and the second connector in a reversed polarity configuration as compared to the second state.

42. The system of any one of clauses 33-41, further comprising a multiplexer operable to communicate with the smart sensor and at least one other smart sensor, wherein the multiplexer is connected to the first connector and the second connector.

Aspects of the present disclosure, for example, are described above with reference to block diagrams and/or operational illustrations of methods and systems according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The invention claimed is:

1. A system comprising:
a first smart module connector and a second smart module connector, the first and second smart module connectors being electrical conductors that can be connected to an external device;
a sensor comprising a first sensor connector and a second sensor connector, wherein the second sensor connector is connected to the second smart module connector, and wherein the first sensor connector is connected to the first smart module connector when the system is in a first state, thereby enabling the sensor to communicate information generated by the sensor to a connected external device using at least one of the first smart module connector and the second smart module connector; and
a smart module having a controller, wherein the controller is connected to the second smart module connector, and wherein the controller is connected to the first smart module connector when the system is in a second state, such that the controller can communicate with a connected external device using the first smart module connector and the second smart module connector when the system is in the second state.

2. The system of claim 1, further comprising a switch having at least a first switch state and a second switch state, wherein the first switch state is associated with the first state and the second switch state is associated with the second state;
wherein the switch, in the first switch state, causes the first sensor connector to be electrically connected to the first smart module connector and causes the controller to be electrically disconnected from the first smart module connector; and
wherein the switch, in the second switch state, causes the first sensor connector to be electrically disconnected from the first smart module connector and causes the controller to be electrically connected to the first smart module connector.

3. The system of claim 2, wherein the switch is changeable from the first switch state to the second switch state based on the voltage applied to the switch.

4. The system of claim 2, wherein the switch is a field-effect transistor having a gate pin, a source pin, and a drain pin, and wherein the system further comprises a resistor and a charge diode connected in series between the source pin of the field-effect transistor and the drain pin of the field-effect transistor.

5. The system of claim 1, further comprising at least one indicator connected to the controller, wherein the indicator is selected from the group consisting of:
a light-emitting diode; and
a buzzer.

6. The system of claim 1, further comprising a bridge rectifier connected to the first smart module connector and the second smart module connector.

7. The system of claim 1, further comprising a detection means useable by the controller to detect at least one of a voltage and a current for the first smart module connector and the second smart module connector.

8. The system of claim 1, further comprising a modulation means useable by the controller to modulate at least one of a voltage and a current for the first smart module connector and the second smart module connector when the system is in the second state.

9. The system of claim 1, wherein the sensor is one of an unpowered sensor or a powered sensor.

10. A method for communicating with a smart sensor comprising a sensor and a controller, the method comprising:
- receiving a selection of a sensing state for the smart sensor;
- in response to the selection of the sensing state, adapting a first lead and a second lead of the smart sensor to the sensing state;
- receiving, using the first lead and the second lead, information from the sensor of the smart sensor;
- generating digital output based on the received information;
- receiving a selection of a first controller state for the smart sensor;
- in response to the selection of the first controller state, adapting the first lead and the second lead of the smart sensor to the first controller state; and
- communicating, using the first lead and the second lead, with the controller of the smart sensor.

11. The method of claim 10, wherein adapting the first lead and the second lead of the smart sensor between the sensing state and the controller state comprises adjusting at least one of:
- a voltage applied to the first lead and the second lead;
- an impedance between the first lead and the second lead; and
- a current through the first lead and the second lead.

12. The method of claim 10, wherein communicating with the controller further comprises:
- initiating a first communication session with the controller;
- after a period of time, determining no response has been received during the first communication session;
- when it is determined no response has been received, adapting the first lead and the second lead of the smart sensor to a second controller state, wherein the second controller state comprises a different polarity for the first lead and the second lead than the first controller state; and
- initiating a second communication session with the controller.

13. The method of claim 10, wherein communicating with the controller comprises at least one of:
- transmitting information to the controller by modulating at least one of a voltage and a current of the first lead and the second lead; and
- receiving information from the controller by detecting a modulation of at least one of a voltage and a current of the first lead and the second lead during the controller state.

14. The method of claim 10, further comprising:
- receiving a selection of a locate state for the smart sensor; and
- in response to the selection of the locate state, adapting the first lead and the second lead of the smart sensor to the locate state.

15. The method of claim 14, wherein adapting the first lead and the second lead of the smart sensor to the locate state comprises at least one of:
- adjusting a voltage applied to the first lead and the second lead to a different voltage than for the sensing state and the first controller state;
- adjusting an impedance applied to the first lead and the second lead to a different impedance than for the sensing state and the first controller state; and
- adjusting a current through the first lead and the second lead to a different current than for the sensing and the first controller state.

16. A system comprising:
- a first connector and a second connector, wherein the first connector is configured to accept a first sensor connector of a smart sensor and the second connector is configured to accept a second sensor connector of the smart sensor, and wherein the smart sensor has at least two operating states;
- a first switch and a second switch, each having at least a first state and a second state, wherein the first state is associated with a first operating state of the smart sensor, and the second state is associated with the second operating state of the smart sensor;
- a controller connected to the first connector and the second connector, wherein the first switch and the second switch are controllable by the controller, such that the controller is operable to change the state of the first switch and the second switch; and
- a power source that, when the first switch and the second switch are in the first state, is disconnected from at least one of the first connector and the second connector, and, when the first switch and the second switch are in the second state, is connected to the first connector and the second connector.

17. The system of claim 16, further comprising a detection means useable by the controller to detect at least one of a voltage and a current for the first connector and the second connector.

18. The system of claim 16, further comprising a modulation means useable by the controller to modulate at least one of a voltage and a current for the first connector and the second connector when the smart sensor is in the second state.

19. The system of claim 16, wherein the first switch and the second switch each have a third state, such that the power source is connected to the first connector and the second connector in a reversed polarity configuration as compared to the second state.

20. The system of claim 16, further comprising a multiplexer operable to communicate with the smart sensor and at least one other smart sensor, wherein the multiplexer is connected to the first connector and the second connector.

* * * * *